United States Patent Office 3,846,079
Patented Nov. 5, 1974

3,846,079
VERTICAL REACTION VESSEL FOR EFFECTING REACTION OF LIQUID AND GASEOUS REACTANTS BY LIQUID-GAS CONTACT
Jacob Alagy, La Celle St. Cloud, Bernard Cha, Chatou, and Cornelis Koen, Mareil Marly, France, assignors to Institut Francais du Petrole, des Carburants et Lubrifiants, Rueil Malmaison, France
Continuation of abandoned application Ser. No. 38,729, May 19, 1970, which is a division of application Ser. No. 649,191, June 27, 1967, now Patent No. 3,609,176. This application June 13, 1972, Ser. No. 262,257
Int. Cl. C07f 5/04
U.S. Cl. 23—283
9 Claims

ABSTRACT OF THE DISCLOSURE

A substantially vertical reaction vessel having a curvilinear wall and containing at least one liquid reactant, e.g. liquid hydrocarbons, at a predetermined liquid level therein, an inlet duct for admitting a gaseous reactant, e.g. an oxygen-containing gas into the vessel below said liquid level, an outlet duct for drawing out gas including the gaseous reactant from the vessel above the liquid level, a liquid outlet duct for withdrawing the liquid reactants containing the resulting reaction products, e.g. the oxidation products from the lower portion of the vessel, conduit means in comunication with said liquid outlet duct for recycling a portion of the liquid reactant containing the reaction products to at least one contact zone within the liquid in said vessel, and at least one stirring duct means in communication with said conduit means for injecting recycled liquid into the contact zone in a tangential direction to impart to the liquid in the vessel a rotational movement in a single direction.

BACKGROUND OF THE INVENTION

The present application is a continuation of application Ser. No. 38,729 filed May 19, 1970, now abandoned, which application in turn is a divisional application of Ser. No. 649,191 filed June 27, 1967, now Pat No. 3,609,176.

It is known that the oxidation of saturated, linear or cyclic hydrocarbons by means of gaseous oxygen or air, in the presence of a boric acid (for example ortho-, meta or pyro-boric acid), of boric anhydride or a boric ester, or any equivalent boron compound, provides boric esters of the alcohols which correspond to said hydrocarbons.

Oxygen is generally used at a concentration of from 1 to 25% in admixture with an inert gas such as nitrogen.

For example, the oxidation of cyclohexane under these conditions, provides a cyclohexyl borate. Other oxidizable hydrocarbons are those which contain from 5 to 30 and preferably from 5 to 8 carbon atoms in their molecule, for instance, heptane, isooctane, decane, cyclooctane, cyclododecane, methylcyclohexane and dimethylcyclohexanes (ortho-, meta or para).

The oxidation temperature is usually comprised between 100 and 200° C., preferably between 140 and 190° C., the selected pressure being sufficient to maintain the hydrocarbon in the liquid phase and for example within the range of from 1 to 40 atmospheres.

By hydrolysis of the reaction product, before or after the separation of the unconverted hydrocarbon, there is recovered an organic phase containing the desired alcohol, for example cyclohexanol, and an aqueous phase containing boric acid.

In case of use of a boron compound which is not soluble in all proportions in the reaction medium, for instance metaboric acid, some difficulties are encountered: the boron compound as well as tarry products tend to be deposited and to accumulate on the walls of the reaction vessel and in the vicinity of the gas injector. These deposits disturb the normal working of the apparatus and may even cause the stopping of the operation thereof as a result of the obstruction of the injection gas holes.

The tarry products are deposited particularly at the upper part of the vessel, above the upper level of the liquid. Moreover there is observed that particles of metaboric acid are continuously drawn away by the residual gases.

The above-mentioned inconveniences are not particular to the reaction of cyclohexane oxidation in the presence of boric acid, they are often observed when a liquid is to be contacted with a gas, in the presence of solid particles directly intervening in the reaction or used to catalyse the same.

SUMMARY OF THE INVENTION

It is the object of the present invention to remedy these inconveniences and to significantly increase the yields in alcohols by providing various improvements to the process of oxidizing hydrocarbons and various changes in the structure or method of operation of already known oxidation apparatus.

These improvements are illustrated by the accompanying drawings, which are not intended in any way to limit the scope of the invention, and wherein.

A first improvement consists of carrying out the oxidation of saturated hydrocarbons having from 5 to 8 carbon atoms per molecule, in the liquid phase, with the provision of a contact height Ho between said liquid phase and the oxidizing gas passing therethrough, at least equal to twice the mean diameter D of said phase, preferably at least equal to 3 times and more preferably to 5 to 15 times this mean diameter. The boric reactant is a boric acid or anhydride.

This improving feature results in an unexpected increase in selectivity as well as in an increased conversion rate.

This is quite surprising since only an increase of the conversion rate was expectable as a result of the increase of the ratio Ho/D, whereas a better selectivity at equal conversion rate was not to be expected at all, the more so as an increase in the conversion rate in oxidation reactions is known in the art as always resulting in a decrease in selectivity, contrarily to what is observed in the present case.

Moreover, in the case of oxidation of heavier hydrocarbons, for instance with 12 to 28 carbon atoms per molecule, the height Ho does not seem to have any effect on the selectivity, even when said oxidation is conducted in the presence of a boron compound and by means of a molecular oxygen-containing gas, as it is the case in the present process of oxidizing saturated hydrocarbons having from 5 to 8 carbon atoms per molecule.

A second improving feature, which may be used in combination with the preceding one and is applicable to saturated hydrocarbons having from 5 to 30 carbon atoms per molecule, is characterized in that a part of the liquid phase containing the catalyst and subjected to oxidation, which is continuously withdrawn from the reaction medium is reinjected, preferably tangentially, into said medium from a plurality of points at different levels.

Figures 1, 2, 3, 3A:
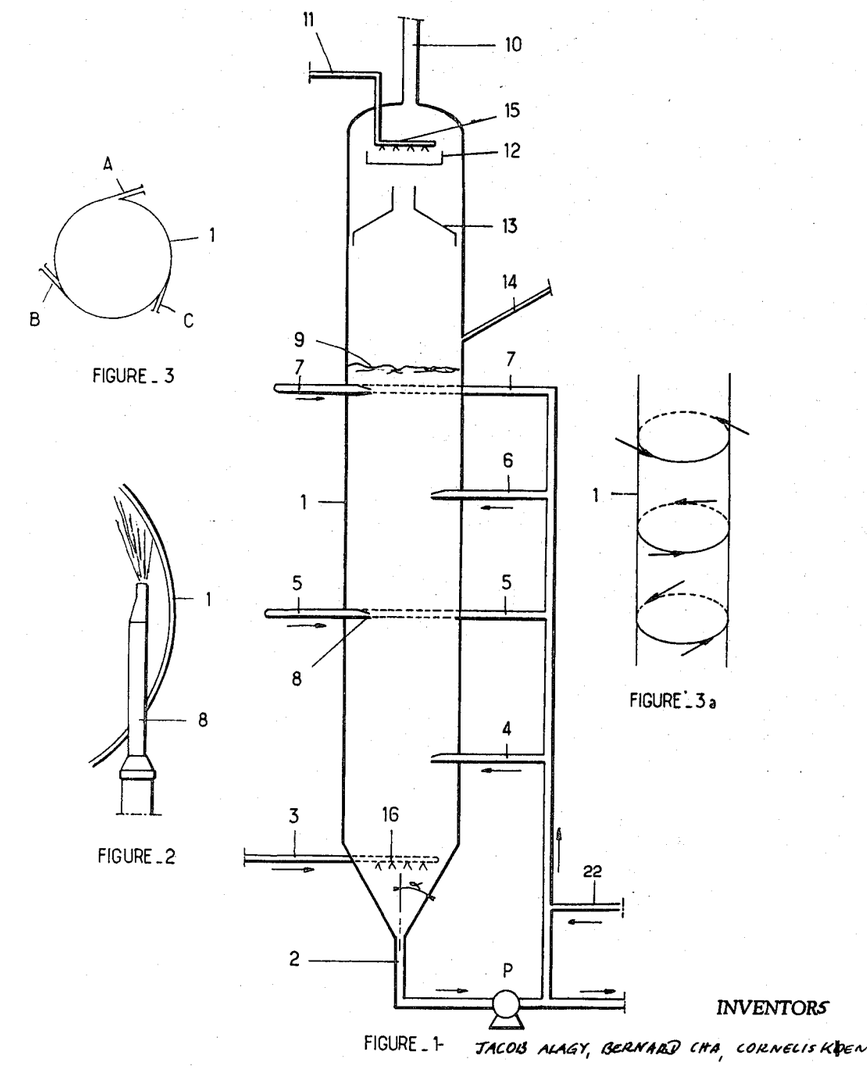
FIG. 1 is a cross-section by a vertical plane of the oxidation apparatus according to the invention.
FIG. 2 is an enlarged partial cross-section in a horizontal plane of the same apparatus, showing in detail an injector.
FIG. 3 is a cross-section by a horizontal plane of the oxidation reaction vessel according to the invention.

The object of this provision is not only to provide an excellent homogenization of the reaction medium, in combination with a liquid recycling which improves the conversion rate, but also to suppress the dead zones favorable to deposit of solids as it will be clearly apparent from the description of an apparatus such as that shown in FIG. 1, which apparatus is in conformity with the principle of the invention.

A third improving feature in the process object of the invention consists in imparting to the liquid subjected to oxidation, a rotational movement such that the inverted cone or central air-hole generated thereby has a height $h$ comprised between 30 and 90% and preferably between 40 and 70% of the weight $H$ of the same liquid in a stationary state.

The advantages provided by this improving feature will be apparent from the following description. An apparatus adapted for practising the three above-mentioned improving features comprises a vertical tower or column 1 (FIG. 1) having a conical bottom terminating with an outlet duct 2 for liquid products. The tower bottom exhibits a strong conicity, the half-angle $\alpha$ at the peak of the cone being advantageously lower than 45°, for example comprised between 2 and 45° and preferably of the order of 30°.

Duct 3 conveys a gas containing molecular oxygen and more particularly air, optionally admixed with an inert gas or vapors of recycled hydrocarbon. Duct 3 is placed preferably toward the basis of the cone and terminates with a conventional gas injection device into the column, for example a distributor 16 in the form of a perforated ring, the holes of which are preferably oriented toward the bottom of the column. By this way the gases supplied under substantially high pressure first stir the liquid under the distributor and thereafter flow up along the column so that any dead volume of liquid at the bottom of the reaction vessel is avoided.

A preferred solution, in view of the same purpose, consists of making use of an apparatus with a conical bottom, the walls of said bottom being perforated with holes through which the gas is injected.

Figure 4:
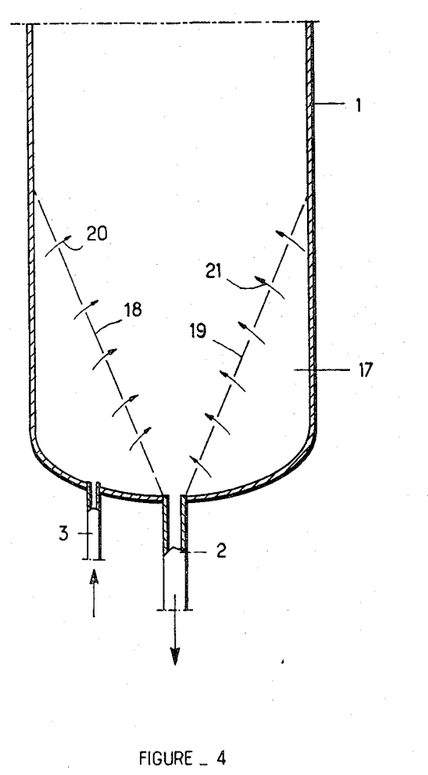
FIG. 4 shows, in vertical cross-section, the lower part of the oxidation reaction vessel according to the invention.

The injecting ring which terminates with the duct 3 is then no longer necessary. Such a device is schematically shown in FIG. 4. The gas under pressure issuing from duct 3 fulfills the volume 17 limited by the casing 1 of the column and the conical walls 18 and 19 of the bottom penetrates the liquid body as shown by the arrows 20 and 21.

The liquid outflow from duct 2 is aspirated by the pump P and the larger part thereof is forced through the various ducts 4, 5, 6 and 7, called "stirring" ducts and is recycled into the column at different levels. The "stirring" ducts are advantageously terminated by a narrowing, for instance injection nozzles 8 one of which is shown schematically in FIG. 2 (cross-section of column 1 by a horizontal plane).

It can be seen that the liquid jet is oriented tangentially to the walls of the column, so as to wash the internal surface thereof, by imparting to the liquid in the column a circular movement.

There are shown on FIG. 1 four stirring ducts at different levels and diametrally opposite by pairs. Of course a different number of such ducts may be used according to the size of the oxidation reaction vessel. Thus there may be used for example six stirring ducts conveying the liquid at different levels and opening in the reaction vessel at angular intervals of 120° from each other. Such an arrangement is shown in FIG. 3 wherein duct A is placed at the level of the horizontal cross-sectional plane and ducts B and C at lower levels. The injection nozzles are not shown in this figure. The three other stirring ducts are hidden by the three former ones. Whereas in FIG. 1 (or in FIG. 3) a single injection nozzle is placed at a given level, there may be placed two injection nozzles at the same horizontal level, which corresponds to the arrangement of the simplified diagram of FIG. 3a wherein the nozzles are shown by arrows.

It is preferable that the latter duct (duct 7 in the arrangement of FIG. 1) be close to the liquid-gas interface 9 and that at least the majority of the injection nozzles be so oriented as to impart to the liquid as a whole a rotational movement in one direction about a vertical axis. If this latter condition were not fulfilled, dead zones would occur within the liquid body which favor solid deposits and, as already mentioned, are detrimental to a good operation of the apparatus. Duct 7, by causing a strong stirring, prevents the formation of deposits in the vicinity of interface 9.

The reaction vessel shown in FIG. 1 is given by way of example; its cross-section by a horizontal plane is a circle and it can be seen on FIGS. 2 and 3 that the injection nozzles are horizontal and oriented tangentially to the walls of the reaction vessel.

However it is not excluded to make use of a reaction vessel whose cross-section in a horizontal plane is a curvilinear figure different from a circle, for instance an ellipse.

The term tangential injection as used above must be understood with its broader meaning. In fact it is sufficient, in order to impart to the liquid a rotational movement without substantial formation of dead zones, to give to the recycled liquid any direction of injection different from the vertical and radial ones.

As shown in FIG. 1 the liquid outflow from the reaction vessel conveyed through duct 2 is partly recycled at different levels by ducts 4 and 7 and partly supplied to a subsequent stage, for example to the hydrolysis so as to recover the oxidation products and the unconverted hydrocarbon.

Of course, the whole outflow from duct 2 could be recycled to the reaction vessel, the liquid from which are recovered the reaction products being withdrawn from another duct, not shown in the figure.

However, the selected arrangement is more advantageous since it makes it possible to reduce the number of pumps.

The reaction vessel comprises at its upper part two ducts 10 and 11. Through the first (10) are evacuated the residual gases (essentially nitrogen when a mixture of nitrogen with oxygen is forced through duct 3, together with vapors of non-oxidized hydrocarbon). Through the second duct (11) is conveyed the liquid hydrocarbon, preferably warm, used for washing the gases.

It can be seen that the top of the column is provided also with a cup-shaped receiver and thereunder another one 13, funnel-shaped, in overturned position.

Through duct 14 is introduced the charge, optionally admixed with a part or the totality of the catalyst. This charge may consist for instance of cold or heated cyclohexane which may have boric acid suspended thereinto. Duct 14 opens above the interface into the gaseous phase. However it is also possible to have this duct opening within the liquid.

The role of the different parts of the reaction vessel is as follows:

The stirring ducts 4 to 7 are provided essentially in order to maintain the solid catalyst suspended into the liquid body.

In fact, the flow rate through the different ducts is high, which results, at the outlet of the nozzles, in linear speeds of the liquid of, for instance, 2 to 20 meters per second, preferably 2 to 10 meters per second.

Under these conditions a very satisfactory stirring is achieved. Moreover, the special orientation of the nozzles, which results in a continuous washing of the walls of the column, contrary to the prior devices, prevents or makes negligible deposits of solid products.

The stirring of the liquid is favored by gas bubbles issuing from duct 3 and distributor 16. The gas escapes therefrom with a very high velocity, for instance between 10 and 100 meters per second, these values being however not limitative.

It has been observed that a half peak-angle $\alpha$ of less than 45° for the conical bottom was necessary in order to avoid solid deposits in this part of the reaction vessel and that a value of angle $\alpha$ of the order of 30° was quite satisfactory in order to completely avoid this risk without suffering from any particular drawback for its technological achievement.

The further improvement to the oxidation apparatus resulting from the use of the device placed at the top of the column, results mainly in that losses of boric acid, which was heretofore drawn along with the vapors, are avoided.

Figure 5:
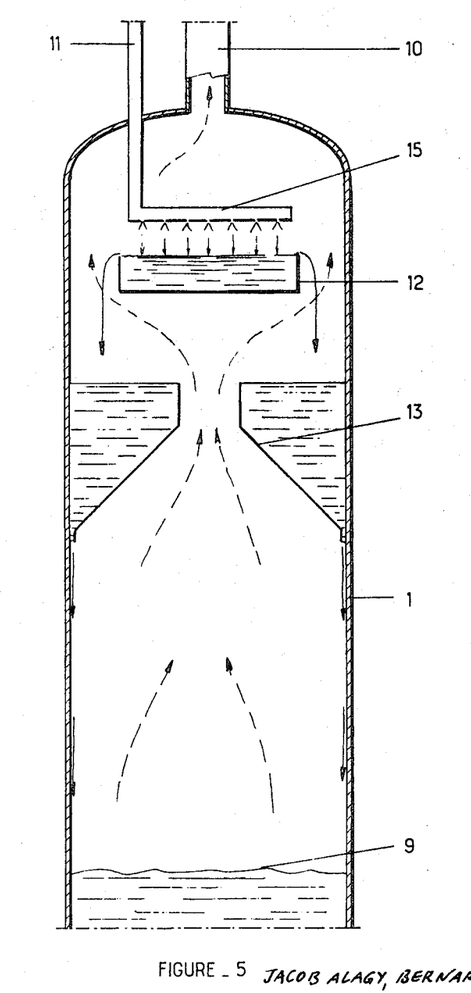
FIG. 5 shows, in vertical cross-section, the upper part of an oxidation reaction vessel according to the invention.

In fact, the liquid hydrocarbon, issuing from duct 11 through row 15, fulfills the cup 12 and runs out by overflow to the lower stage (see FIG. 5 showing only the top of the column).

This liquid is rejected, by the overturned funnel 13, toward the walls of the column and wash the same before reaching the interface 9 and joining the body of the reaction liquid. The gases escaping from said interface follow the travel shown by the arrows in dotted line (whereas the travel of the liquid is shown by the arrows in solid line). It is seen that the gases (consisting essentially of nitrogen and hydrocarbon vapors drawing along therewith fine catalyst particles) ascend in the center of the column through the narrowing of the funnel.

In order to escape from the reaction vessel through duct 10, the gases must pass through the substantially continuous screen formed by the washing liquid flowing down from the cup 12 and loss therein the solid particles of catalyst which they have drawn away. The so-scrubbed gases escape from the column through duct 10. They may be advantageously recycled, at least partly, to the bottom of the column after their admixture with fresh air.

The washing liquid issuing from the duct 11 is preferably warm so as to avoid at this level the condensation of water which is obligatorily formed in an oxidation reaction. This water would impede, in case of oxidation of cyclohexane in the presence of boric acid, the formation of the boric ester.

In most cases the temperature difference between the washing liquid and the washed vapors is lower than 60° C. and preferably lower than 25° C.

The preferred method consists of washing the vapors with liquid hydrocarbon whose temperature is the same as that of the vapors.

The funnel 13 must be placed sufficiently above the interface 9 as to avoid any projection of solid particles from the liquid body which would be otherwise deposited and form tarry products thereon. Besides, the funnel itself may be washed by a part of the liquid flowing at the center thereof.

The above-described arrangement for the top of the column is only an example of embodimnet of this invention and other embodiments are also contemplated as being within the scope of the invention.

More complicated embodiment of the same type may comprise a plurality of stages similar to those described above, through which a liquid phase and a gaseous phase carrying along solids, flow in countercurrent relationship so that the gases pass, at least twice, through a substantially continuous liquid stream which scrubs them, said liquid further washing the walls of the reaction vessel after leaving the lower stage.

The washing system shown here at the upper part of the reaction vessel 1 may be exterior thereto. Moreover, such a washing system is no more than a preferred manner of carrying out such an operation which may also be achieved with the use of other types of apparatuses such as, by way of non limitative examples, apparatuses of the "Venturi" type or the "Cyclone" type as well as washing towers with filling material.

In case of use of the two first types of apparatus, fine droplets of liquid are dispersed in the gas to be scrubbed, the velocity of the latter being increased either by a narrowing ("Venturi") or by a whirling movement (Cyclone). These droplets retain the solid particles carried away by the gas. Any conventional washing system may therefore be used.

FIG. 1 shows a duct 22 opening downstream the pump P into the common duct through which passes the liquid which is recycled at different levels.

This duct may have different uses:

One may introduce therein a part or the whole amount of the boric acid necessary to the oxidation reaction. This way of injecting the catalyst is particularly advantageous since it results in a very rapid dispersion of said acid within the reaction medium.

It may be used to convey to the different stirring ducts either vaporized hydrocarbon or additional liquid hydrocarbon (this latter advantageously conveying acid particles) or a hydrocarbon previously used for washing the gas evolved from the body of reaction liquid.

However, it is preferable that all the vaporized hydrocarbon be admixed with the oxidizing gas and injected at the bottom of the reaction vessel as described in a prior application filed by the applicant.

Figure 6:
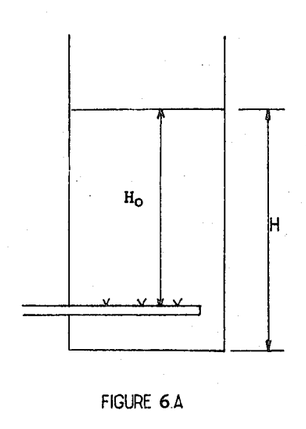
FIG. 6A is a schematic vertical cross-section of an oxidation apparatus wherein the liquid is stationary.
FIG. 6B is a schematic vertical cross-section of an oxidation apparatus, wherein the liquid is subjected to a rotational movement about a vertical axis resulting in a central gas hole in the liquid.
Figure 6B:
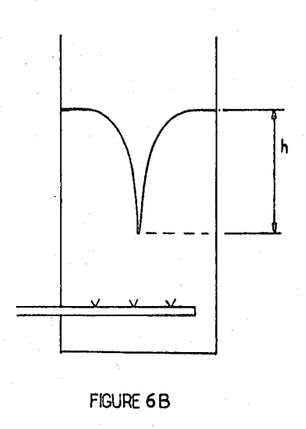

FIGS. 6A and 6B respectively show a reaction vessel wherein the body of liquid of height H is stationary and another one wherein, due to the whirling movement, there is formed an inverted cone or central air hold over a height $h$ at the center of the reaction vessel. This whirling movement is of great importance since, inasmuch as it complies with the above-mentioned conditions for $h/H$, it results in the following advantages:

The oxidizing gas, after its passage through the body of liquid where it becomes poorer in oxygen, escapes through the central cone, thereby avoiding the formation of foams which would be produced at the upper inetrafce liquid-gas 9 (FIG. 1) if the liquid was not driven in said whirling movement.

Such foams, where present, cause such a raising of the upper level of the liquid that they very often oblige to stop the operation.

Due to the whirling movement and the centrifugal force resulting therefrom the solid particles of boric acid tend to be rejected toward the periphery of the liquid body whereas the liquid at the center of the reaciton vessel, i.e. in the vicinity of this cone or central "air hole" becomes relatively poorer in boric acid. The oxidizing gas flowing through the central passage therefore carries along less of solid particles, which is of interest, although scrubbing devices for the gaseous streams are already provided at the upper part of the reaction vessel, as hereafter described.

Such advantages will be obtained if the ratio $h/H$ of the height of the central air hold to that of the liquid body in a stationary state is comprised between 0.3 and 0.9 and preferably between 0.4 and 0.7.

A central air hole of the convenient size within the reaction liquid body will be easily achieved due to lateral liquid injections at different points of said body.

For example in the case of the reaction vessel shown in FIG. 1 it is possible to act upon both the number of injectors and the flow rate of liquid through each of them, in order to obtain the desired value of the ratio $h/H$.

It must be understood that there may be used a plurality of reaction vessels of the type schematically shown in FIG. 1, such reaction vessels being used either in series or in parallel with respect to the liquid outflows therefrom.

In either case, the reaction vessels may have their own scrubbing system at the top of each one (of the type shown in FIG. 1 or of any similar type) or the gaseous outflows from the different reaction vessels may be collected in a single stream which will be washed in a single apparatus operated according to the same principle of the continuous liquid screen or to any other principle providing for the same result with regard to the removal of the solid particles.

A fourth improving feature in the process of oxidizing hydrocarbons having from 5 to 30 carbon atoms per molecule, and which can be advantageously combined with the three preceding ones, consists in a two-stage washing of the gaseous outflow from the oxidation zone.

During a first stage the gases issuing from the liquid phase are washed with a first hydrocarbon stream of the same nature as that subjected to oxidation.

This first stream of liquid is at a temperature which differs by less than 60° C. and preferably by less than 25° C. from the temperature of the gases with which it is contacted. The object of this first stage is not to condense the gases but to retain the solid particles and the drops of liquid phase from the reaction vessel which might have been drawn along therewith.

In a second stage the gaseous outflow is contacted with a second stream of liquid hydrocarbon, also of the same nature as the hydrocarbon subjected to oxidation.

This second liquid stream is colder than the first one and may be, after contact, partially or entirely vaporized and recycled in a vaporized form to the oxidation reaction vessel. In the first case (partial vaporization), the other part of the liquid (non-vaporized part) may be used as washing liquid in the first stage, either as such, or after addition of fresh liquid saturated hydrocarbon of the same nature as that issuing from the first stage. It is however also possible to directly recycle this non-vaporized liquid fraction to the oxidation reaction vessel.

As for the liquid hydrocarbon issued from the first washing stage, it will be advantageously introduced in a liquid state in the oxidation reaction vessel.

Figure 7:
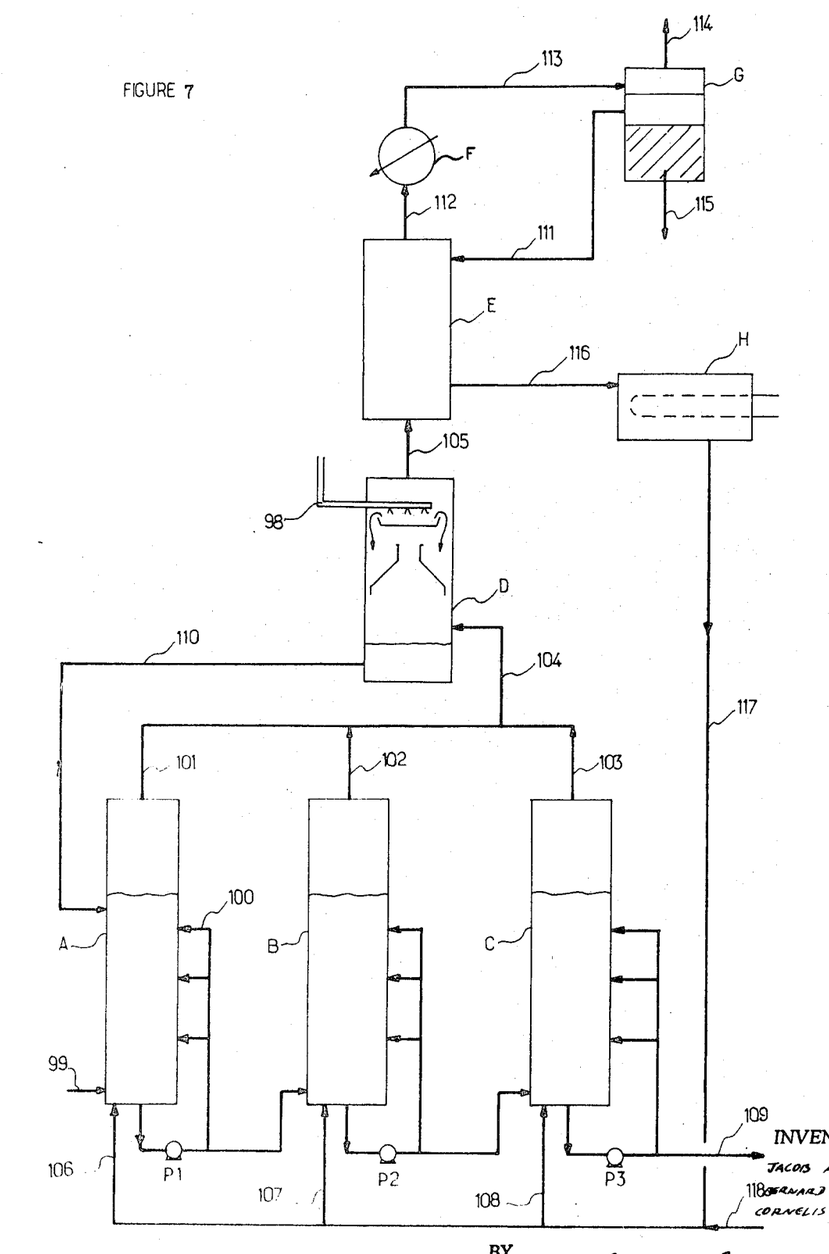
FIG. 7 is a general view of 3 oxidation apparatuses, surmounted with gas washing devices.

FIG. 7, which shows a more complete assembly of oxidation apparatus, illustrates more particularly the fourth improving feature of the invention.

A, N and C are 3 oxidation reaction vessels connected in series, the liquid outflow from the first reaction vessel being conveyed to the second one through the pump P1 and the liquid outflow from the second reaction vessel being conveyed to the third one through the pump P2. The oxidation product aspirated from this last reaction vessel by pump P3 is recovered from duct 109.

By duct 99 is introduced fresh hydrocarbon to be oxidized, in the event of an insufficient flow rate through duct 98 (the object of which will be described hereinafter).

Through ducts 106, 107 and 108 is introduced a gas containing molecular oxygen; moreover a part of the liquid outflow from the three reaction vessels is recycled in each of them at different levels of the liquid body, through ducts such as that having the reference numeral 100.

The gaseous outflows from the 3 reaction vessels, conveyed through ducts 101, 102 and 103 are collected in a single gaseous stream (duct 104) which is washed in the washer D. This washer is fed with the first washing liquid, i.e. with hydrocarbon of the same nature as that subjected to oxidation, which liquid is conveyed through duct 98. The device which is diagrammatically illustrated by a cup and an inverted funnel and which may be replaced by any equivalent device, has for object to make easier the contact between the washing liquid and the gas to be purified.

In fact, the liquid hydrocarbon issuing from duct 98, in first fulfills the cup placed at the upper part of the washer before overflowing on the inverted funnel which rejects it against the walls of the washer.

The gaseous outflow introduced into duct 104, raises in the washer D through the narrowing of the funnel and must, in order to escape from the washer through duct 105, go through the substantially continuous screen of washing liquid.

Through duct 110 is supplied the first washing liquid to the oxidation reaction vessel A. This liquid might also be supplied to reaction vessel B or C or to a plurality of said reaction vessels.

It is also possible to carry out this first washing stage in any other apparatus adapted for contacting a gas with a liquid, for instance an apparatus of the "Venturi" or "Cyclone" type.

Each of the three reaction vessels A, B or C may be provided with its own washing system either incorporated to the reaction vessel or not.

In the washer D the condensation of the hydrocarbon vapors is generally low, lower than 75% and generally comprised between 0 and 15% due to the small temperature discrepancy between the vapors and the washing hydrocarbon supplied by duct 98. This hydrocarbon is of the same nature as that subjected to the oxidation. On the other hand substantially all the solid impurities such as acid and boric ester particles are retained thereby. It is therefore a purified gas, issuing from line 105 which is directly contacted in an exchanger E, preferably countercurrently with the relatively cold hydrocarbon supplied by duct 111 whose origin will be explained hereinafter and which is used as second liquid stream.

The gas issuing from the washed D consists essentially of nitrogen and hydrocarbon vapors.

At this stage a large part of the hydrocarbon vapors is condensed by transferring their calories to the second liquid stream; the remainder, drawn away through duct 112, is condensed in F.

A mixture of uncondensable gases with liquid is conveyed from the outlet of the condenser F through duct 113, to the decanter G wherein is effected the separation of three phases: the uncondensable gases, essentially nitrogen, which escape through duct 114 while there are obtained at the lower part of the decanter, an aqueous phase which is removed through duct 115 and an organic phase, consisting of the saturated hydrocarbon, which is recycled through duct 111 to the heat exchanger E where it is contacted, as already mentioned, with still hot and washed vapors conveyed through duct 105.

The reheated hydrocarbon, at the outlet of the exchanger, is conveyed through duct 116 to the vaporizer H. In this apparatus the hydrocarbon is vaporized and the so-obtained gas, evolving from the apparatus through duct 117, is injected in the 3 oxidation reaction vessels through ducts 106, 107 and 108. Prior to this injection, the vaporized hydrocarbon may be admixed with an oxidizing gas stream delivered by duct 118.

The peculiarity of such a general assembly consists mainly in the fact that only the liquid outflow from exchanger E is vaporized. As a matter of fact, in some of the already known processes, at least a part of the liquid hydrocarbon which has been contacted with the gaseous outflow from the reaction vessel was vaporized without the provision of a prior washing of said gaseous outflow as achieved presently in apparatus D.

Such a device was not satisfactory since the vaporized hydrocarbon was containing boric acid and more particularly boric esters which were decomposed during the vaporization stage or at the least resulted in the formation of undesirable deposits on the tubes or other heating circuits.

These decomposed products, reintroduced with the saturated hydrocarbon in the oxidation zone have a detrimental effect on both the purity of and the yield in the desired alcohol. Due to the improving feature illustrated by FIG. 7, such a drawback is avoided since the second hydrocarbon stream, which is conveyed through duct 116, does not contain boric compounds and may consequently be evaporated without inconvenience.

Naturally a part of the liquid outflow from exchanger E, conveyed through duct 116, may be used as washing liquid for apparatus D together with, if necessary, a complemental amount of fresh hydrocarbon through duct 98. The other part will be directly supplied to the vaporizer H.

The general diagram shown in FIG. 7 is no more than one example of embodiment of the invention and many modified embodiments may be considered.

Thus, the oxidizing gas delivered by duct 118, and which is admixed with the vaporized hydrocarbon, might issue from decanter G through duct 114. In fact, still a little hot uncondensable gases (essentially nitrogen) may be used as oxidizing gases after addition thereto, of course, of the necessary oxygen complement.

It is also possible to inject a part of the vaporized hydrocarbon at different levels of the liquid body contained in the oxidation reaction vessels, for instance through the recycling-stirring ducts.

The invention is further illustrated by the following non-limitative Examples 1 to 3; Examples 1A, 1B, 3A and 3B being given for comparative purposes only and being not within the scope of the invention.

EXAMPLE 1

There is used as oxidation reaction vessel, a cylinder of stainless steel having a ratio of its height to its diameter equal to 6.

A reaction vessel of this type is shown in FIG. 1. It is provided with 6 tangential injection means for the recycling-stirring liquid, at 3 different levels and at its upper level with a gas scrubbing system such as shown in this figure.

This reaction vessel is fulfilled with cyclohexane suspended boric acid. When stationary the liquid has a height H equal to 5 times the diameter of the reaction vessel.

The liquid phase is maintained at a temperature of 170° C. under a pressure of 10.5 kg./cm.$^2$.

In the reaction vessel are introduced continuously liquid cyclohexane at a rate of 55 liters per hour and metaboric acid (2.1 kg. per hour). Into the reaction vessel at the bottom thereof, is blowed a gaseous mixture formed of 6% (by volume) of oxygen and 94% of nitrogen. The oxygen feeding rate corresponds to 960 liters per hour.

The liquid level is maintained constant in the reaction vessel by withdrawal of a part of the liquid outflow, at the outlet from pump P.

At the center of the liquid body there is observed the formation of an air-hole due to the rotational movement resulting from the tangential injections of liquid, the height $h$ of said air-hole being 50% of the height H of the liquid body in a stationary state.

This non-recycled part of the outflow is hydrolyzed. After separation of the unconverted cyclohexane, there is obtained a mixture of the cyclohexanol with cyclohexanone with a molar yield of 91.6% and a conversion rate equal to 11.7%.

In this example, as well as in the following ones, the yield is expressed in cyclohexanol+cyclohexanone mixture with respect to the cyclohexane consumed in the oxidation reaction.

EXAMPLE 2

Example 1 is repeated in a reaction vessel of equal volume, wider but shorter. In this reaction vessel the ratio of the height of the liquid in a stationary state to the diameter is equal to 2. This new reaction vessel is also provided with six lateral injections at 3 different levels (of course, these 3 levels are not so distant from each other than in the first example.)

All other conditions are identical to those of Example 1 (temperature, pressure, flow rates, total amount of liquid present in the reaction vessel, etc. . . .).

After hydrolysis of the liquid outflow it is observed that the yield is cyclohexanol+cyclohexanone and the conversion rates are respectively of 90.2% and 10.3%.

EXAMPLE 1A

Example 1 is reepated but with a shorter reaction vessel wherein the ratio of the height of the liquid in a stationary state to the diameter is equal to 1.5. All other conditions being identical to those of Example 1 (number of injectors, temperature, pressure, flow rates, etc.), there is observed a decrease in the yield of cyclohexanol+cyclohexanone and in the conversion rate respectively to 88.3% and 9.1%.

EXAMPLE 1B

There is used a reaction vessel having the same size as that of Example 1 and containing the same initial amount of cyclohexane.

However, this reaction vessel is not provided with a liquid-recycling duct; the liquid phase is stirred by means of a conventional device, i.e., a rotatable blade stirrer.

The same operating conditions as in Example 1 are used. In such a case no air hole is formed at the center of the liquid body.

In spite of a strong stirring, the formation of deposits on the walls of the reaction vessel is to be observed.

After hydrolysis and separation of the unconverted cyclohexane, there is obtained a mixture of cyclohexanol-cyclohexanone with a molar yield of 87.2% and a conversion rate of 8.8%.

EXAMPLE 3

Cyclohexane oxidation is carried out in a unit similar to that shown in FIG. 7. In the three reaction vessels A, B and C is maintained a temperature of 165° C. under a pressure of 10.5 kg./cm.$^2$. The gaseous outflows from the three reaction vessels are collected together and washed in apparatus D by means of a liquid cyclohexane stream introduced at a temperature of 160° C. from duct 98. This first liquid cyclohexane stream is conveyed, after scrubbing of the gases, to reaction vessel A.

The gaseous outflow, first washed in D, is contacted, in apparatus E, with liquid cyclohexane introduced at a temperature of 40° C. (from duct 111).

The liquid cyclohexane issuing from contractor E is vaporized in H. The so-obtained cyclohexane vapors are introduced at the base of the three reaction vessels, in admixture with air.

This system has been working perfectly for several weeks.

EXAMPLE 3A

By way of comparison, the liquid output from contractor E has been conveyed to the reaction vessel A and the liquid cyclohexane output from the washed D has been vaporized (otherwise stated, the injunction points of ducts 116 and 110 have been interchanged).

There was very quickly observed a formation of deposits on the tubes of the vaporizer H, which resulted in an increase in the stream amount required for vaporizing the cyclohexane; moreover a light yellowing of the liquid obtained from duct 109, was observed.

EXAMPLE 3B

In another comparative test, the contactor E was suppressed. The gaseous outflow from washer D was directly supplied to condenser F through duct 105.

The liquid cyclohexane conveyed through duct 111 has been used for the scrubbing of the gases at D (i.e., duct 111 and 98 were interconnected).

The liquid outflow from D (duct 110) was supplied to vaporizer H and no longer to reaction vessel A.

The same operating difficulties have been encountered as in the first comparative test (Example 3A).

It wil be understood that, while there have been given herein certain specific examples of the practice of this invention, it is not intended thereby to have this invention limited to or circumscribed by the specific details of materials, proportions or conditions herein specified, in view of the fact that the invention may be modified according to individual preference or conditions without necessarily departing from the spirit of this disclosure and the scope of the appended claims.

What is claimed is:

1. An apparatus for effecting reaction of liquid and gaseous reactants by liquid-gas contact, which comprises a substantially vertical reaction vessel having a curvilinear wall, said vessel containing at least one liquid reactant at a predetermined liquid level therein; gas inlet means for introducing gaseous reactant into a zone of the liquid reactant in said vessel below the liquid level; an outlet duct for drawing out gas from said vessel above the liquid level; a liquid outlet duct for effecting withdrawal of the liquid reactant containing the resulting reaction products from the lower portion of the vessel below the zone of introduction of said gaseous reactant; conduit means in communication with said liquid outlet duct, provided with pump means, for recycling a portion of the liquid reactant containing the reaction products to at least one contact zone above said gas inlet means within the liquid phase in said vessel; and at least one stirring duct means connected to said conduit means for injecting the recycle liquid into the contact zone in a tangential direction to impart to the liquid in the vessel a rotational movement in a single direction, each of said duct means including an injection nozzle extending horizontally and tangentially adjacent to the curvilinear wall of the vessel whereby said wall is continuously washed by the recycled liquid to prevent deposits of said reaction products thereon.

2. The apparatus of claim 1, in which said conduit means recycles a portion of the liquid reactant containing the reaction products to a plurality of contact zones each vertically arranged above each other at different levels, and a plurality of said stirring ducts are placed at said different levels of the liquid phase in said vessel, each of said stirring ducts being arranged to discharge in the same general tangential direction to impart to the liquid phase a rotational movement in a single direction.

3. The apparatus of claim 1 further comprising a distributor conduit having a plurality of discharge openings directed toward the bottom of said vessel for injecting the oxygen-containing gas from a plurality of locations at the bottom of said vessel.

4. The apparatus of claim 1, in which said vessel has a conically shaped bottom, the half peak-angle of said conical bottom being lower than about 45°.

5. The apparatus of claim 1, in which said vessel is provided with a conical bottom, the walls of which are perforated with holes, said bottom defining an annular chamber with the base of said vessel, and said inlet duct being in communication with said annular chamber whereby said oxygen-containing gas is introduced into the vessel via said plurality of holes.

6. The apparatus of claim 1, in which said vessel is provided with a gas scrubbing system adjacent to said outlet for the gaseous reactant.

7. The apparatus of claim 1, in which the contact height between the liquid phase in said vessel and the gaseous reactant passing therethrough is equal to at least three times the mean diameter of said vessel.

8. The apparatus of claim 7, in which said height is preferably from 5 to 15 times the mean diameter of said vessel.

9. An apparatus for effecting reaction of liquid and gaseous reactants by liquid-gas contact which comprises a substantially vertical reaction vessel having a curvilinear wall, said vessel containing at least one liquid reactant at a predetermined liquid level therein; at least one gas inlet duct for admitting a gaseous reactant into said vessel; said apparatus being terminated at the bottom with a liquid outlet duct for effecting withdrawal of the liquid reactant containing the resulting reaction products, each gas inlet duct being below the liquid level in the bottom portion of the apparatus above the liquid outlet duct; conduit means in communication with said liquid outlet duct, provided with pump means, for recycling a portion of the liquid reactant containing the resulting reaction products to at least one contact zone within the liquid phase in said vessel, said conduit means being arranged so that at least one of said contact zones is above the uppermost gas inlet duct, and at least one stirring duct means connected to said conduit means for injecting the recycle liquid into at least one of the contact zones in a tangential direction to impart to the liquid in the vessel a rotational movement in a single direction, each of said duct means including an injection nozzle extending horizontally and tangentially adjacent to the curvilinear wall of the vessel.

References Cited
UNITED STATES PATENTS

| | | | |
|---|---|---|---|
| 3,172,736 | 3/1965 | Gee et al. | 23—285 |
| 2,432,175 | 12/1947 | Schmidt | 259—95 |
| 2,747,847 | 5/1956 | Otto | 261—36 R |

JAMES H. TAYMAN, JR., Primary Examiner

U.S. Cl. X.R.

259—95; 261—36 R, 76, 77; 23—260